United States Patent
Ammitzboell

(10) Patent No.: US 6,934,292 B1
(45) Date of Patent: Aug. 23, 2005

(54) METHOD AND SYSTEM FOR EMULATING A SINGLE ROUTER IN A SWITCH STACK

(75) Inventor: Benny L. Ammitzboell, Vaerloese (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/436,918

(22) Filed: Nov. 9, 1999

(51) Int. Cl.[7] ............................................. H04L 12/56
(52) U.S. Cl. .................................. 370/400; 370/395.53
(58) Field of Search ............................... 370/216, 217, 370/218, 351, 389, 359.53, 400, 386, 392

(56) References Cited

U.S. PATENT DOCUMENTS

| | | | | |
|---|---|---|---|---|
| 5,473,599 A | * | 12/1995 | Li et al. ...................... | 370/219 |
| 6,256,314 B1 | * | 7/2001 | Rodrig et al. ................ | 370/401 |
| 6,262,977 B1 | * | 7/2001 | Seaman et al. .............. | 370/256 |
| 6,424,659 B2 | * | 7/2002 | Viswanadham et al. .... | 370/469 |

FOREIGN PATENT DOCUMENTS

| | | | |
|---|---|---|---|
| EP | 001006702 A2 | * 12/1999 | ............ H04L 29/14 |
| EP | 001011231 A2 | * 12/1999 | ............ H04L 12/56 |

OTHER PUBLICATIONS

"Draft Standard P802.1Q/D11 IEEE Standards for Local and Metropolitan Area Networks: Virutal Bridge Local Area Networks". Internworking Task Group of IEEE 802.1. Jul. 30, 1998. pp. 159-165, 198-199,210-211.*

"Cajun P330 The Modular Stackable Switching System". Lucent Technologies. Jul. 1999. pp. 1-6.*

Li et al. "Cisco Hot Standby Router Protocol (HSRP)". Network Working Group RFC 2281. Mar. 1998. pp. 1-17.*

Song et al. "Scalable Fault-Tolerant Network Design for Ethernet-based Wide Area Process Control Systems". IEEE International Conference. Oct. 18, 2001. pp. 315-323.*

S. Knight et al., "Virtual Router Redundancy Protocol", Request for Comments 2338, Apr. 1998, Network Working Group.

* cited by examiner

Primary Examiner—Chi Pham
Assistant Examiner—Derrick W Ferris
(74) Attorney, Agent, or Firm—Blakely, Sokoloff, Taylor & Zafman LLP

(57) ABSTRACT

A system and method for emulating a single router in a switch stack is described. The switch stack is connected to virtual local area networks (VLANs) and comprises a number of stack devices that can include routing devices (RDs) having interfaces to the VLANs and non-routing devices (NRDs). All of the interfaces of the RDs share the same router and VLAN configuration addresses, including router Media Access Control addresses. One RD is appointed as a master in the switch stack and all other RDs use the configuration addresses of the master. Each NRD is owned by a corresponding routing device according to an ownership algorithm. The shared configuration addresses allow the switch stack to appear as a "virtual router" to nodes belonging to VLANs connected to the switch stack.

23 Claims, 6 Drawing Sheets

METHOD AND SYSTEM FOR EMULATING A SINGLE ROUTER IN A SWITCH STACK

BACKGROUND OF THE INVENTION

1. Field of the Invention

The present invention relates generally to networking computer systems, and more particularly to networking computer systems having devices that emulate a single router in a switch stack.

2. Background Information

A virtual local area network (VLAN) is a group of personal computers (PCs), servers, and other network resources and stations that behave as if they were connected to a single network segment, as determined by some network administrator-defined criteria. For example, all marketing personnel may be spread throughout a building, but if they are all assigned to a single VLAN, they can share resources and bandwidth as if they were connected to the same segment.

FIG. 1 illustrates an example of a building 10 having one or more VLANs. The VLANs are segmented from each other by one or more switches 14, 16, 18 operating at the Media Access Control (MAC) sublayer of the Data Link layer (Layer 2) of the International Standards Organization (ISO) Open Systems Interconnection (OSI) reference model. For instance, one of the VLANs can comprise PCs 19 associated with an administrative department. Other VLANs can comprise PCs 20 associated with a marketing department and PCs 21 associated with an engineering department. Each of these VLANs can further include one or more, shared or non-shared, printers 22, hubs 24, and servers 26. The switches 14, 16, 18 are in turn coupled to a router 28 operating at the Network layer (Layer 3) of the OSI reference model. The router 28 connects the VLANs together or connects the VLANs to a wide area network (WAN) 30, and allows communication between the various VLANs or between the VLANs and the WAN 30. The various components (e.g., the PCs 19, 20, 21) connected together in an individual VLAN are sometimes referred to as "nodes" or "stations." The switches 14, 16, 18 and the router 28 are sometimes referred to as "routing devices" (RDs).

In operation, messages (e.g., packets) transferred between nodes of the same VLAN are transmitted at the MAC sublayer (Layer 2), based on each node's MAC address (e.g., by using MAC source and destination addresses). Messages transferred between nodes of different VLANs are most often transferred at the Network layer (Layer 3) via the router 28, based on a Network layer address, such as an Internet Protocol (IP) address of each node.

In an effort to increase network capacity and performance, RDs (e.g., any one of the switches 14, 16, 18 that have Layer 3 switching capability) and non-routing devices (NRDs) (e.g., any one of the switches 14, 16, 18 that have only Layer 2 switching capability, Gigabit modules for Gigabit Ethernet applications, or asynchronous transfer mode (ATM) modules) are sometimes connected in a "switch stack" configuration. As shown in FIG. 2, a switch stack 32 may comprise a plurality of stack devices 34, 36, 38, 40, 42, which can be RDs or NRDs. Each stack device 34–42 can work as both a stand-alone unit or as a unit belonging to part of the stack 32. Further, each stack device 34–42 in the stack 32 can "see" all of the other stack devices 34–42 in the stack 32 as a "neighbor." That is, the stack devices 34–42 are joined together via their stack ports (not shown) to form a matrix connection 44 in a backplane 46. The stack devices 34–42 have a plurality of front ports 48 connected to nodes of their respective VLANs.

Referring next to FIG. 3, a RD (e.g., the stack device 34) performs routing between VLANs A and B with corresponding router interfaces 50 and 52, for each VLAN A and B, respectively. Each router interface 50, 52 has a MAC address (e.g., MAC A and MAC B addresses) associated with it, which is used by the router 28 (see, e.g., FIG. 1) when transmitting packets, and packets sent to that MAC address are sent to the router 28. The router 28 can also receive other packets depending on the types of higher layer protocols (e.g., Layer 3 or Layer 4 protocols like IP Routing Information Protocol (IP RIP), IP filtering, Resource Reservation Setup Protocol (RSVP), IP multicast, Internet Group Multicast Protocol (IGMP) pruning, and Internet Packet Exchange RIP or Service Access Protocol (IPX RIP/SAP)) that are implemented when broadcast or multicast packets are sent between the VLANs. As such, the router interfaces 50, 52 are also associated with IP and IPX addresses, as shown in FIG. 3.

However, configurations such as those shown in FIGS. 2 and 3 suffer from several drawbacks. For instance, although the stack devices 34–42 are stacked, they are managed as individual devices, and therefore add to the number of devices for which a network administrator is responsible. Further, inter-switch connections of the switch stack 32 limit their scalability. For example, to obtain scalable performance for the five stack devices 34–42 shown in FIG. 2, routing needs to be configured in each of the devices 34–42 and up to five different IP or IPX addresses need to be used for each VLAN A and B. This type of configuration would require complicated analysis as well as reconfiguration of the total network in order to obtain proper loadsharing. Accordingly, how RDs and NRDs are stacked together needs improvement.

SUMMARY OF THE INVENTION

An embodiment of the present invention provides a switch stack connected to networks. The switch stack comprises a number of stack devices arranged in a stack configuration, with each stack device having first ports coupled to the networks and second ports coupled to other stack devices in the stack configuration. A first interface in each stack device associated with one of the first ports has a same address as other first interfaces of other stack devices in the stack configuration, with the first interface corresponding to one of the networks coupled to the stack devices. A second interface in each stack device associated with another one of the first ports has a same address as other second interfaces of other stack devices in the stack configuration, with the second interface corresponding to another one of the networks coupled to the stack devices. A first stack device routes a packet from the one network to a second stack device, and the second stack device sends the packet to the another one of the networks.

BRIEF DESCRIPTION OF DRAWINGS

Non-limiting and non-exhaustive examples of embodiments of the present invention will be described in the following figures, wherein like reference numerals and labels refer to like parts throughout the various views unless otherwise indicated.

DETAILED DESCRIPTION OF THE ILLUSTRATED EMBODIMENTS

A system and method for emulating a single router in a switch stack is described in detail herein. This is analogous to a form of "Layer 3 stacking." In the following description, numerous specific details are provided, such as the identification of various network protocols, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Figure 4:
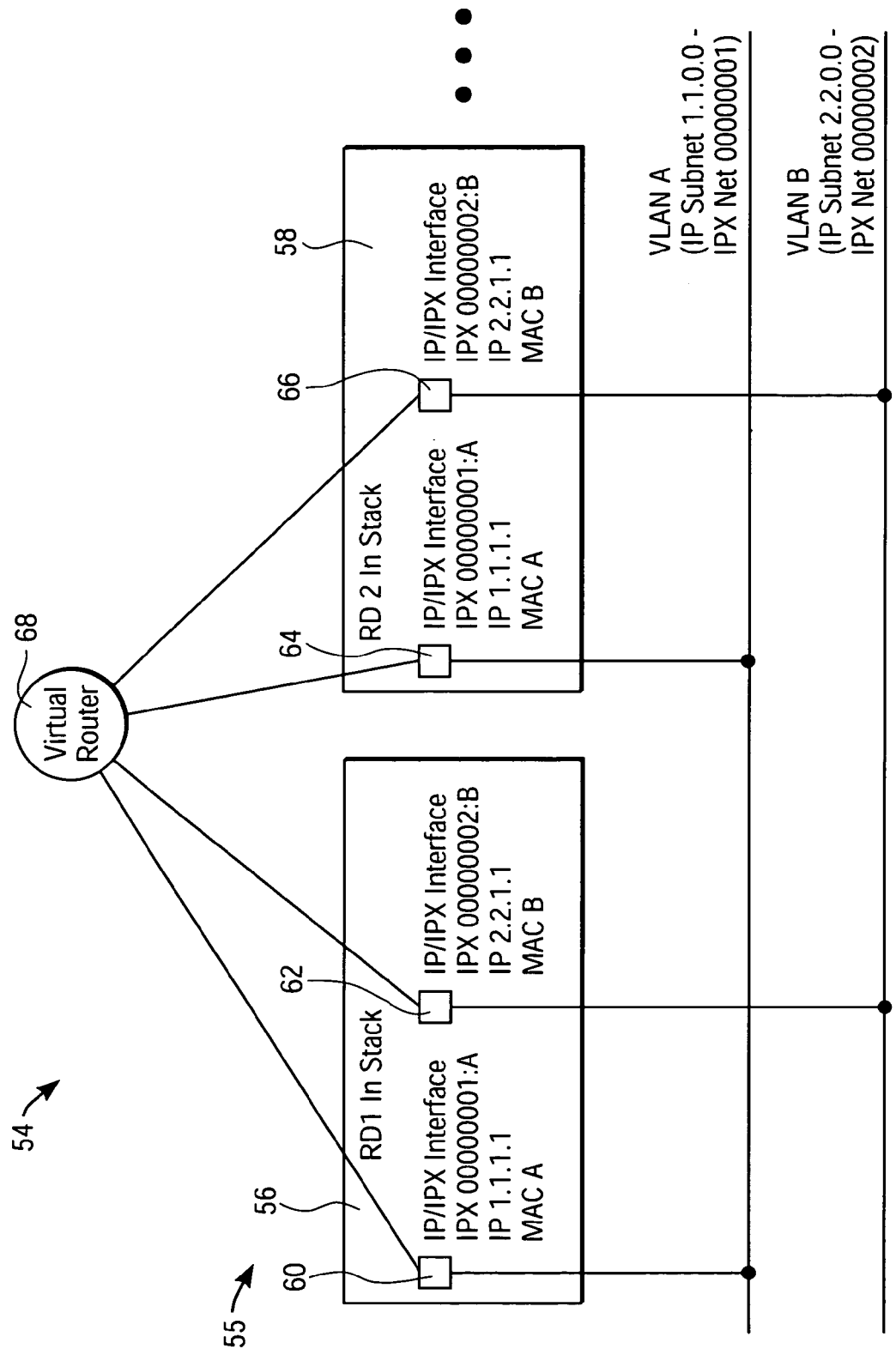
FIG. 4 is a block diagram illustrating a connection of routing devices to VLANs according to an embodiment of the invention.

Referring first to FIG. 4, shown generally at 54 is a switch stack in accordance with an embodiment of the present invention. The switch stack 54 comprises a plurality of stack devices 55, such as RDs 56 and 58. The RDs 56 and 58 are each connected to the VLANs A and B. Although only the two RDs 56 and 58 and only the two VLANs A and B are shown in FIG. 4 for simplicity of illustration and explanation, it is understood that the switch stack 54 can have any number of RDs connected to any number of VLANs. VLANs are distributed across the switch stack 54 using IEEE Standard 802.1Q (P802.1Q/D11, Jul. 30, 1998) or some other distribution protocol.

The RD 56 has a first IP/IPX interface (or other router interface) 60 having a MAC address (e.g., MAC A), IP address (e.g., 1.1.1.1), and IPX address (e.g., 00000001:A) associated with it. The first IP/IPX interface 60 is in turn coupled to the VLAN A. The RD 56 also has a second IP/IPX interface 62 having a MAC address (e.g., MAC B), IP address (e.g., 2.2.1.1), and IPX address (e.g., 00000002:B) associated with it. The second IP/IPX interface 62 is in turn coupled to the VLAN B. The RD 56 can have any number of IP/IPX interfaces depending on the number of VLANs or other networks that communicate with or are coupled to the RD 56.

In a similar manner, the RD 58 has a first IP/IPX interface 64 having the same MAC address (e.g., MAC A), IP address (e.g., 1.1.1.1), and IPX address (e.g., 00000001:A) as the first IP/IPX interface 60 of the RD 56. The first IP/IPX interface 64 is in turn coupled to the VLAN A. The RD 58 also has a second IP/IPX interface 66 having the same MAC address (e.g., MAC B), IP address (e.g., 2.2.1.1), and IPX address (e.g., 00000002:B) as the second IP/IPX interface 62 of the RD 56. The second IP/IPX interface 66 is in turn coupled to the VLAN B. As with the RD 56, the RD 58 can have any number of IP/IPX interfaces depending on the number of VLANs or other networks that communicate with or are coupled to the RD 58.

All RDs in the switch stack 54 share VLAN and router configurations, including IP addresses and corresponding router MAC addresses, according to the embodiment of the invention shown in FIG. 4. The router configuration is distributed across the switch stack 54 using an appropriate distribution protocol. Because of this sharing of these configuration addresses, all RDs can route in parallel between the VLANs A and B during IP or IPX routing operations, and through special packet handling, the RDs 56 and 58 will seem like one router to any device (e.g., PCs and other nodes within the VLANs A and B) that is connected to the switch stack 54. As will be described in further detail below, each NRD in the switch stack 54 is "owned" by a specific RD, with the result that the entire switch stack 54 appears as one "virtual router" 68. This parallel routing, special packet handling, NRD ownership, and other features are described in detail below with reference to FIGS. 4–7.

Figure 5:
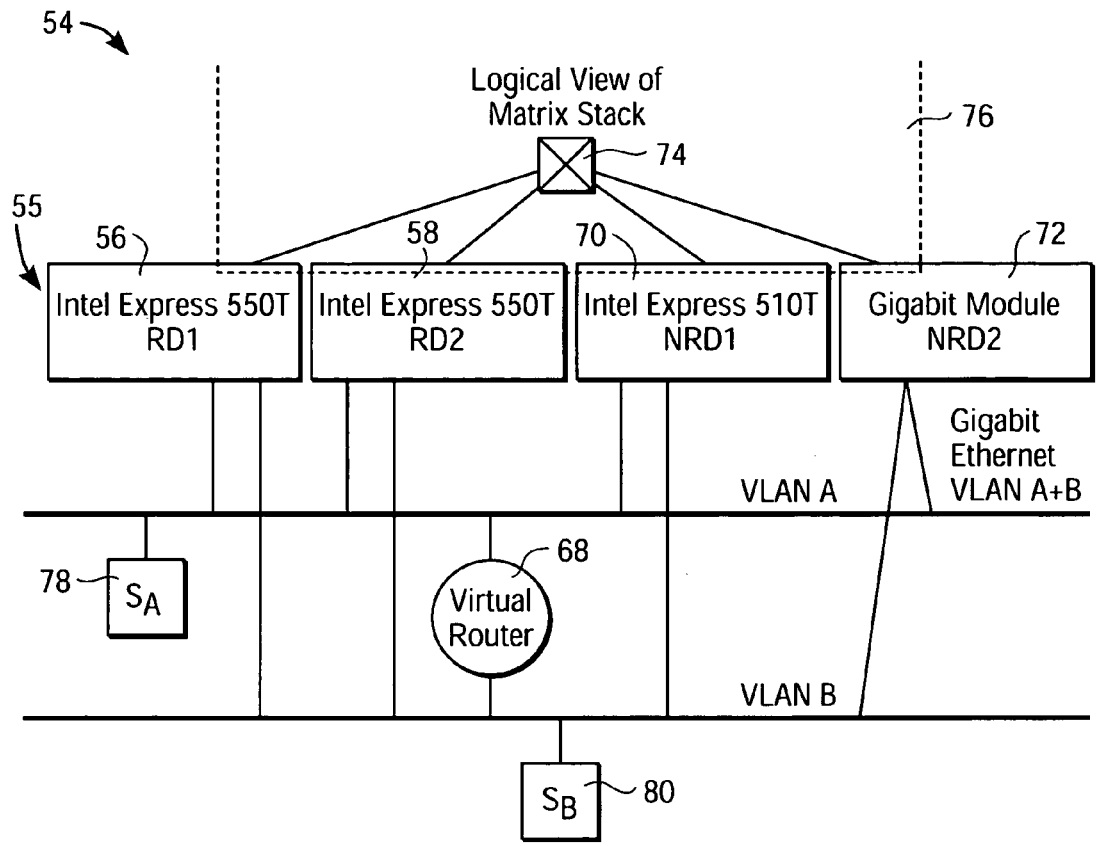
FIG. 5 is a block diagram illustrating a connection of routing and non-routing devices to VLANs according to an embodiment of the invention.

FIG. 5 shows an embodiment of the switch stack 54 similar to the embodiment shown in FIG. 4. In addition to the RDs 56 and 58, the switch stack 54 of FIG. 5 further includes NRDs 70 and 72. The RDs 56 and 58 can be Intel Corporation's Express 550T/550F switches having Layer 2 and Layer 3 switching capabilities, for example. The NRD 70 can be Intel Corporation's Express 510T switch with Layer 2 switching capability, for example. The NRD 72 can be any type of non-routing device, such as a Gigabit Ethernet module, for example. The stack devices 55 comprising the RDs 56, 58 and the NRDs 70, 72 are logically connected via their stack ports (not shown) as a matrix 74 in a backplane 76.

A station (e.g., a node) 78 is located in the VLAN A, and a station 80 is located in the VLAN B. Even though all RDs in the switch stack 54 act as individual routers, it appears to the stations 78 and 80 that there is just one virtual router 68 routing packets between VLANs A and B because all RDs share VLAN and routing configuration addresses (see, e.g., FIG. 4).

A driver (e.g., software) in the backplane 76 acts as an interface to the switch stack 54. The driver detects when any one of the stack devices 55 is part of the switch stack 54 and can report to application modules located in the RDs or NRDs what other stack devices are part of the switch stack 54. The driver does this, for example, by reporting the type of switch, the MAC address of a switch, the location of the switch (e.g., its stack port number), and the IP address of the switch. Thus, the driver can detect when any one of the stack devices 55 is added or removed from the stack 54 and can update shared memory in the backplane 76 with configuration information associated with any of the stack devices 55.

In one embodiment of the present invention, the driver appoints a "stack master." That is, one of the RDs in the switch stack 54 is appointed as the master, and the configuration and MAC addresses of that RD is used by all the other RDs in the switch stack 54. If the master is removed from the switch stack 54, the driver appoints another RD as the master. This new master can be a RD with the highest MAC address, for example. Hence, because a packet sent from the first IP/IPX interface 60 of the RD 56 is not distinguishable from the same packet sent from the first IP/IPX interface 64 of the RD 58, replacing the RD 56 with the RD 58 in the switch stack 54 will be transparent. Also, since the configuration and MAC addresses need to be established only once to obtain the virtual router 68 configuration, a new stack device subsequently added to the switch stack 54 (in order to increase system capacity and performance) adopts the existing configuration addresses and need not be configured with new configuration addresses. Scaleable performance for the switch stack 54 is thus automatically obtained.

Figure 6:
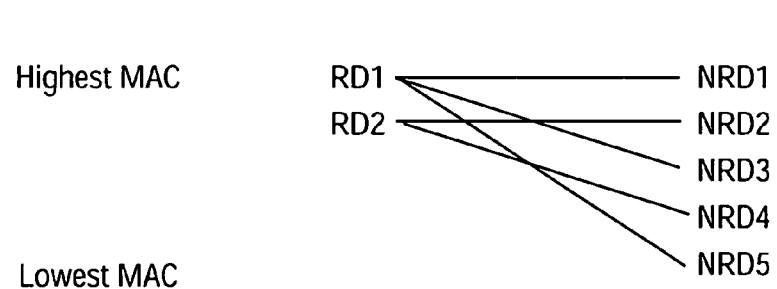
FIG. 6 is an example of an ownership algorithm according to an embodiment of the invention.

In an embodiment of the present invention, the NRDs 70 and 72 in the switch stack 54 are correspondingly assigned to the RDs 56 and 58. An ownership algorithm 82 directed towards this feature is shown in FIG. 6. The ownership algorithm 82 is based on MAC addresses of the stack devices 55 connected in the switch stack 54. The base MAC addresses, device type, and the master is known in the shared memory in the backplane 76 or can be obtained through an appropriate stack protocol running between the stack devices 55. According to the ownership algorithm 82, a RD with the highest MAC address (e.g., RD1 in FIG. 6) owns a NRD with the highest MAC address (e.g., NRD1 in FIG. 6). A RD with the second highest MAC address (e.g., RD2 in FIG. 6) owns a NRD with the second highest MAC address (e.g., NRD2 in FIG. 6), and the process continues for the third, fourth, etc. highest MAC addresses. If there are more RDs than NRDs, then the RDs with the lowest MAC addresses will not own any NRDs. If there are more NRDs than RDs, then the RD with the highest MAC address will own more than one NRD. For instance, in FIG. 6, RD1 owns NRD1, NRD3, and NRD5.

The ownership algorithm 82 can be performed independently by each of the stack devices 55 in the switch stack 54, and all stack devices 55 obtain the same result. In effect, the ownership arrangement makes a RD act as a router for a NRD. That is, as seen from RD ports, an owned NRD provides extra ports for the RD.

In general according to an embodiment of the invention, received multicast packets (e.g., packets directed to a group of nodes in either or both the VLANs A and B) and received broadcast packets (e.g., packets directed to all nodes in either or both the VLANs A and B) are Layer 2 switched to all stack devices 55 in the switch stack 54. This ensures that all topology packets, such as RIP updates, are received by all RDs and that network tables (e.g., lookup tables in the stack devices 55 having information such as MAC and IP addresses of nodes in the VLANs A and B) are exactly the same in all RDs.

Figure 1:
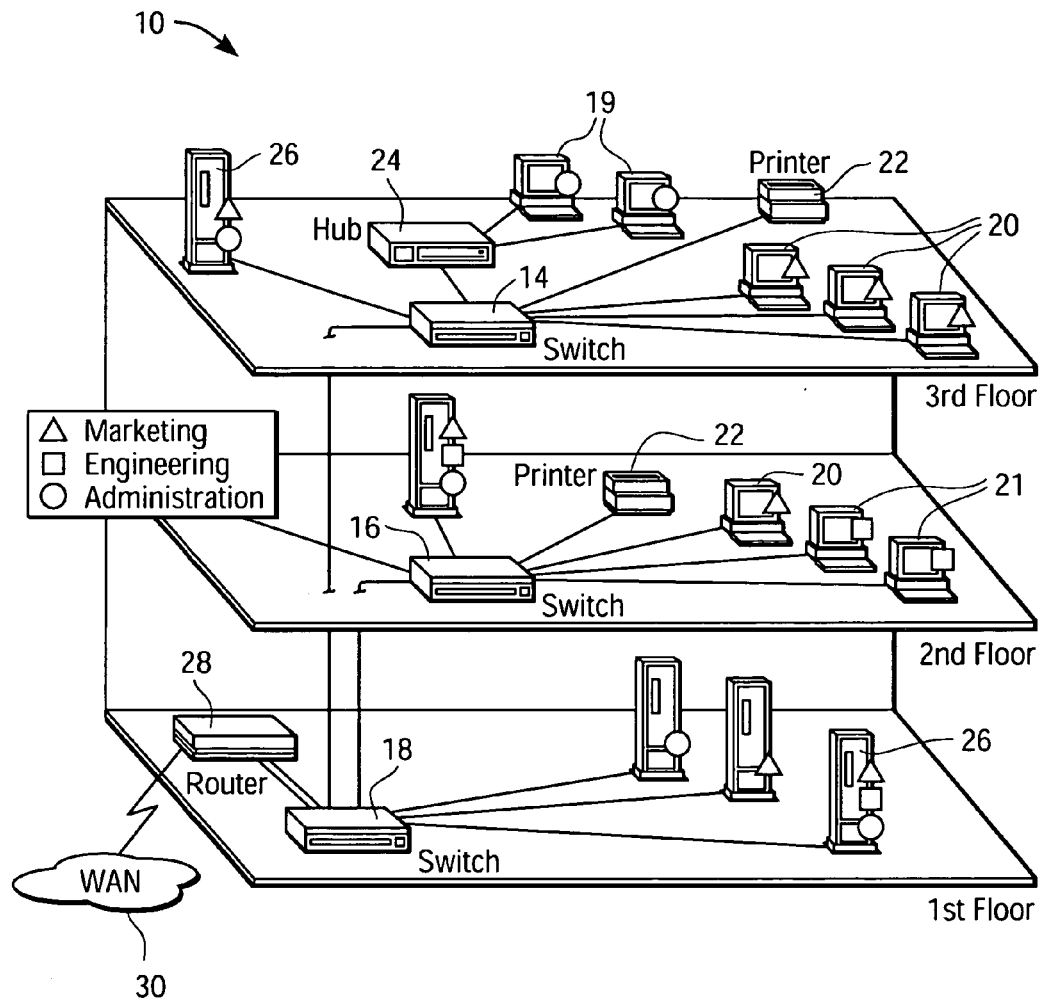
FIG. 1 is an illustration of conventional virtual local area networks (VLANs).
Figure 2:
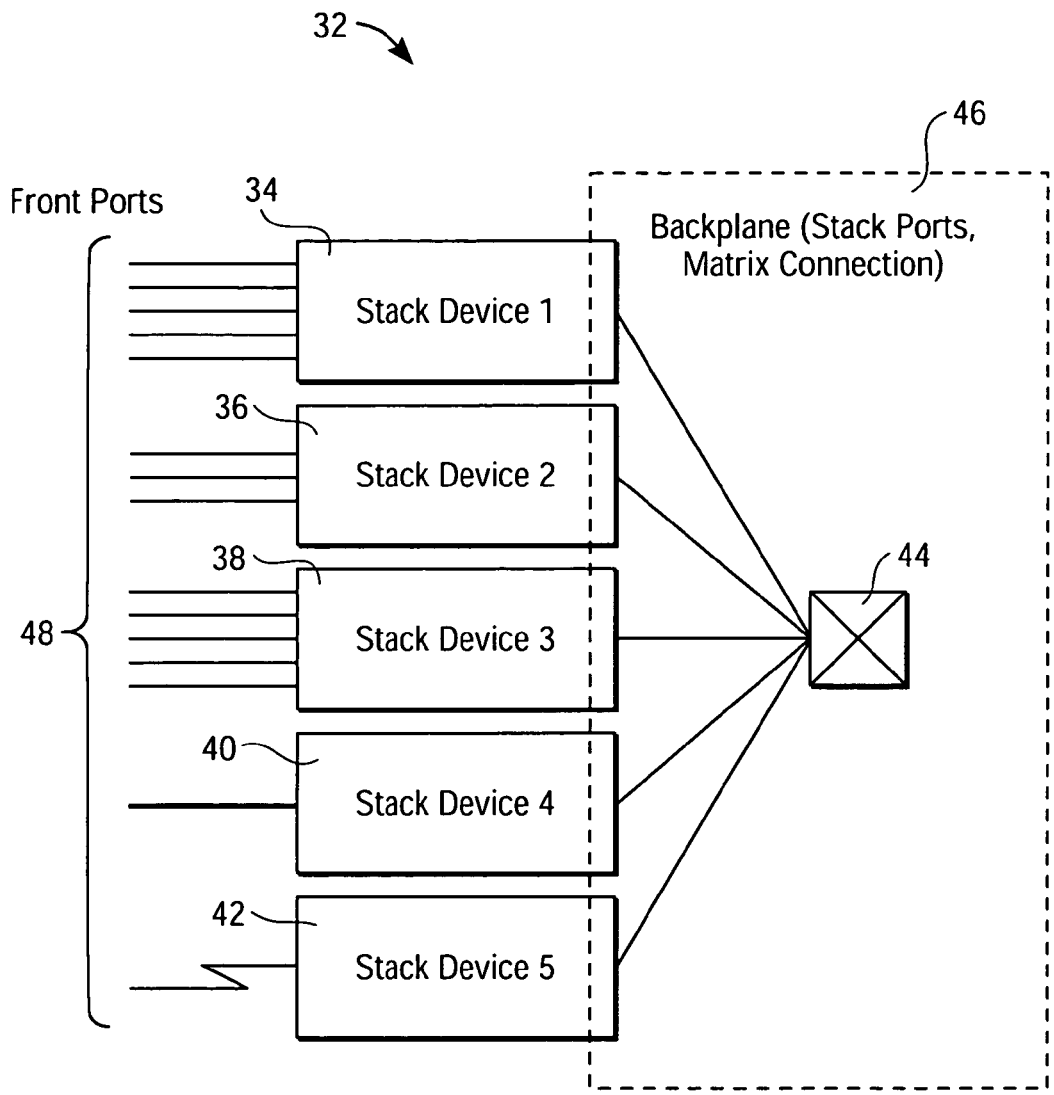
FIG. 2 is a block diagram illustrating a conventional configuration of stack devices.
Figure 3:
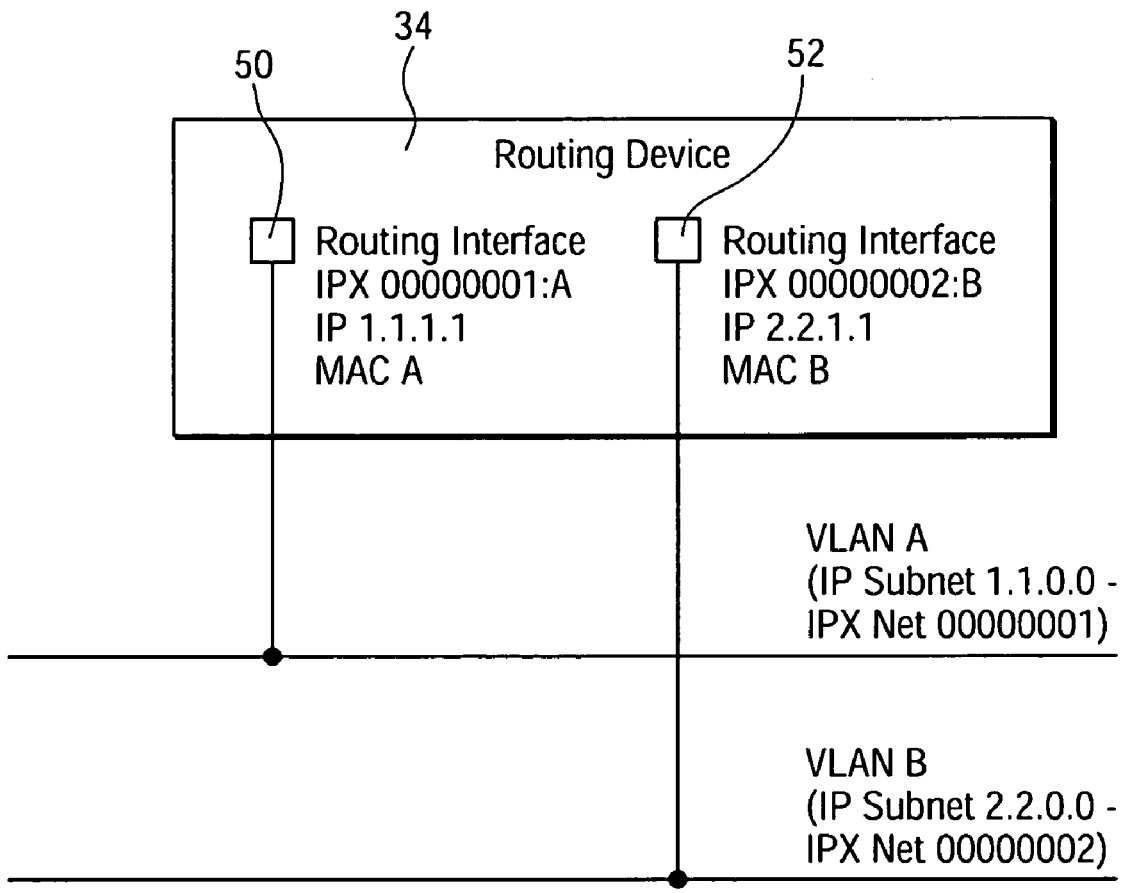
FIG. 3 is a block diagram illustrating a conventional connection of a routing device to VLANs.

Also in general according to an embodiment of the invention, a broadcast packet, multicast packet, or unicast packet (e.g., a packet directed from a single node to a single node within a single VLAN or between two VLANs) is sent by a RD only from "owned" ports. An "owned" port can be a front port of a RD (see, e.g., the front ports 48 shown in FIG. 2) or a stack port of a RD that connects to an NRD owned by that RD. These general procedures can be achieved by proper use of port filters.

A default setting of transmitting packets from RDs is to transmit the packets only on owned ports. For instance, some types of packets, such as IP RIP updates and IPX RIP/SAP updates, should be transmitted by RDs on owned ports and not on non-owned ports. However, some other types of packets, such as Address Resolution Protocol (ARP) requests, should be transmitted by RDs on both owned and non-owned ports.

Special packet handling and other packet sending/receiving procedures for the switch stack 54 are now described in reference to the following cases. While specific procedures for receiving and sending packets are described below, it is understood that different procedures can be utilized as well in order to obtain an appropriate routing of packets by the switch stack 54, such that packet collisions, packet delay, and ambiguities in routing are reduced or eliminated.

Case 1: Layer 3 or Layer 4 Asymmetric Routing.

Figure 7:
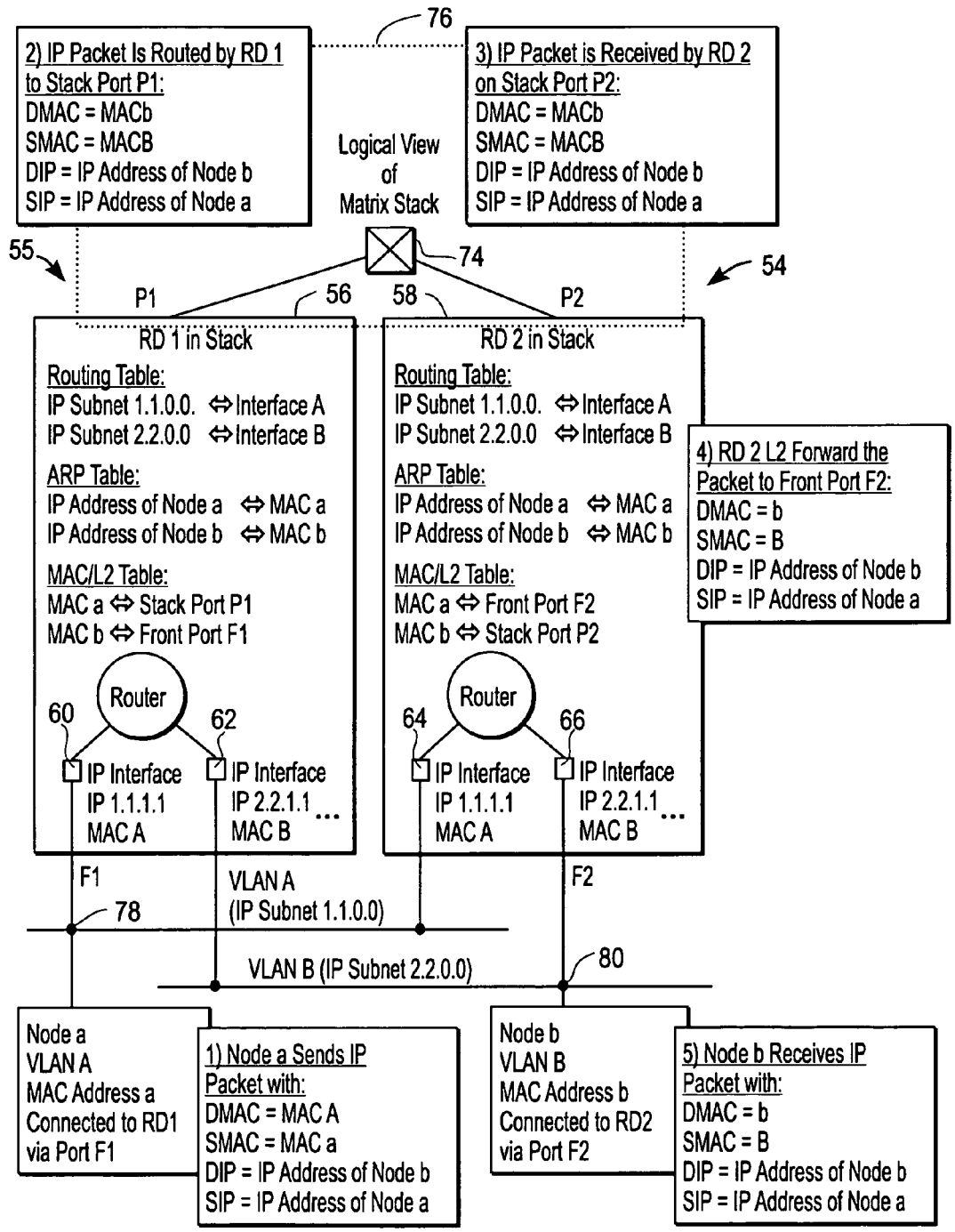
FIG. 7 is a functional block diagram illustrating an example of an asymmetric routing procedure for the embodiments shown in FIGS. 4 and 5.

FIG. 7 illustrates an example of an asymmetric routing procedure for the switch stack 54 of FIGS. 4 and 5. In FIG. 7, a packet is to be routed from a sending node (such as the station 78 or "Node a") in the VLAN A to a receiving node (such as the station 80 or "Node b") in the VLAN B. Node a is connected to the RD 56 via a front port F1, with Node a having a MAC address of "MAC a." Node b is connected to the RD 58 via a front port F2, with Node b having a MAC address of "MAC b." The packet is sent from Node a in the VLAN A to the first IP/IPX interface 60 of the RD 56, with the packet being sent with a destination MAC (DMAC) address of "MAC A" for the IP/IPX interface 60, a source MAC (SMAC) address of "MAC a" for Node a, a destination IP (DIP) address for Node b, and a source IP (SIP) address for Node a. The RD 56 then routes the packet to the second IP/IPX interface 62 of the RD 56, and from there, the packet is sent on a stack port P1 of the RD 56 across the backplane 76, with the packet now having a DMAC address of "MAC b" and a SMAC address of "MAC B". The packet is received at a stack port P2 of the RD 58. From the second IP/IPX interface 66 of the RD 58, the packet is then Layer 2 forwarded to Node b in the VLAN B (e.g., the packet is forwarded from a SMAC address of "MAC B" corresponding to the second IP/IPX interface 0.66 of the RD 58 to a DMAC address of "MAC b" for Node b).

If, however, a packet needs to be routed from Node b in the VLAN B to Node a in the VLAN A, the packet is sent from Node b in the VLAN B to the second IP/IPX interface 66 of the RD 58. The RD 58 then routes the packet to the first IP/IPX interface 64 of the RD 58, and from there, the packet is sent on the stack port P2 of the RD 58, across the backplane 76, and to the stack port P1 of the RD 56. The RD 56 then Layer 2 forwards the packet (e.g., forwards the packet based on its DMAC address of "MAC a") to Node a in the VLAN A.

Thus, the RD 56 performs the routing in one direction, and the RD 58 performs the routing in the reverse direction. Because all RDs have the same MAC addresses, IP/IPX addresses, and routing tables, all RDs can potentially receive and route the same packet. Therefore, an embodiment of the invention is configured such that the RD that receives the packet first from a sending node is chosen as the RD that forwards the packet to a receiving node.

Case 2: NRD Filtering.

Because all RDs in the switch stack 54 share the same MAC address, such as the "MAC A" address for the IP/IPX interfaces 60 and 64 that corresponds to the VLAN A shown in FIG. 7, a unicast packet sent from a node in a VLAN and having a destination address of "MAC A" can potentially go to any of the RDs. Therefore, NRDs according to an embodiment of the invention include a filtering mechanism that enables the NRD to forward a unicast packet received from one of its VLAN nodes and destined for "MAC A" to a router MAC address of the specific RD that owns the NRD and to no other RD.

Case 3: Nodes Send a Multicast/Broadcast Packet Requiring a Unicast answer.

In this situation, only one RD needs to send a unicast reply to the node that sent the multicast/broadcast packet. The RD that sends the unicast reply can be chosen as the RD that receives, on an "owned" port as previously described above, the multicast/broadcast packet from the node.

Case 4: A Received Unicast Needs to be Distributed to all Other RDs, some RDs, or one RD in the switch stack 54 depending on the type of packet received.

An example of this is an ARP reply and certain RSVP packets. An ARP request is initially broadcasted to a network from a RD to obtain a MAC or other address of a specific node in the VLANs A or B. That node then responds to the ARP request with a unicast ARP reply that provides the requested address information. According to an embodiment of the invention, the first RD that receives the unicast reply (which may or may not be the RD that generated the broadcast) from that node is the RD that distributes the unicast reply to all the other RDs in the switch stack 54, and hence to the RD that generated the broadcast message.

Case 5: A Broadcast or Multicast Packet is Sent From all Ports in a Particular VLAN, Including Non-Owned Ports, of a RD.

An example of this is an ARP request that needs to be sent from a RD to all VLAN A or B nodes in order to obtain a MAC address or other address of a specific node receiving the ARP request. Specifically, the broadcast (e.g., the ARP request) sent by the RD in VLAN A is broadcasted on that RD's front ports that are part of the VLAN A and on stack ports (which in this case are owned stack ports coupled to owned NRDs, as well as non-owned stack ports) to other RDs and NRDs in the switch stack 54. These other RDs and NRDs then Layer 2 forward the broadcast to their own front ports that are part of the VLAN A. The ARP reply to the broadcast is then sent according to Case 4 described above.

Case 6: A Unicast Packet Sent from a RD.

An example of this case is when Node a in the VLAN A sends a packet to the RD 56 via the owned front port F1. The RD 56 can then route the packet to a non-owned port, such as the stack port P1 that connects to other RDs in the switch stack 54.

Case 7: Layer 2 Learning and Refreshing (Asymmetric Routing).

Referring to FIGS. 4 and 7, asymmetric routing exists in the case where Node a of the VLAN A connected to the RD 56 sends a packet or other data to Node b of the VLAN B connected to the RD 58 (and vice versa). The RD 56 "hears" from (e.g., receives frames from) the "MAC a" address of Node a and routes frames to Node b of the VLAN B connected to the RD 58. However, the RD 56 never hears from Node b's "MAC b" address at Layer 2. Similarly, the RD 58 hears from the "MAC b" address of Node b and routes frames to Node a of the VLAN A connected to the RD 56, but the RD 58 never hears from Node a's "MAC a" address at Layer 2. This occurs because when a sending node sends a frame to a RD, the RD replaces the sending node's source MAC address in the frame with the MAC address of the RD as part of routing the frame. Normally in conventional systems, this times out ARP entries in the RDs and times out MAC addresses in the RDs, since ARP and MAC entries are normally refreshed when a RD hears from a receiving node having the MAC address.

One embodiment of the present invention addresses this timing-out of the "MAC b" ARP and Layer 2 entries in the RD 56, for example, by first allowing a packet that needs to be routed (from the RD 56 to the RD 58) to generate the ARP request. The ARP reply (having the "MAC b" Layer 2 entry) from the RD 58 is then distributed to all the other RDs in the switch stack 54. This "MAC b" Layer 2 entry is then kept alive (or kept refreshed) in the RD 56 along with a Layer 3 IP entry while the RD 56 transmits to the "MAC b" address. In another embodiment, a protocol can run between the RDs 56 and 58 to allow the RD 58 to refresh MAC and ARP entries in the RD 56 while the entries are active in the RD 58. In yet another embodiment, an ARP request is generated by the RD 56 before timing out to ensure that the MAC entry is still in the RD 56. These same three methods are applicable to address timing-out in the RD 58.

In summary, embodiments of the invention provide a system and method for emulating a single router in a switch stack 54. The switch stack 54 comprises a plurality of stack devices 55 that can include RDs and NRDs. All the RDs share router and VLAN configuration addresses, and each NRD is owned by a corresponding RD. The result of this configuration is that the switch stack 54 appears as a "virtual router" 68 to VLAN nodes connected to the switch stack 54. The RDs in the switch stack 54 only use one IP address per VLAN, while at the same time, scaleable routing performance is automatically obtained without having to reconfigure the switch stack 54 each time a new stack device is added.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A switch stack connected to networks, the switch stack comprising:

a plurality of stack devices arranged in a stack configuration, each stack device having first ports coupled to the networks and second ports coupled to other stack devices in the stack configuration;

a first interface in each stack device associated with one of the first ports and having a same real address as other first interfaces of other stack devices in the stack configuration, the first interface corresponding to one of the networks coupled to the stack devices, wherein each stack device concurrently configured to forward a packet received from the one network, the stack device to first receive the packet from the one network to forward the packet; and a second interface in each stack device associated with another one of the first ports and having a same real address as other second interfaces of other stack devices in the stack configuration, the second interface corresponding to another one of the networks coupled to the stack devices;

wherein a first stack device routes a packet from the one network to a second stack device and the second stack device sends the packet to the another one of the networks.

2. The switch stack of claim 1 wherein the plurality of stack devices include routing devices to route packets from one of the routing devices to another one of the routing devices.

3. The switch stack of claim 1 wherein the plurality of stack devices include routing devices and non-routing devices, the non-routing devices being assigned to a corresponding routing device based on addresses of the routing and non-routing devices, the non-routing devices structured to route packets between nodes within a single network.

4. The switch stack of claim 1 wherein the real addresses of the first and second interfaces comprise Media Access Control (MAC) addresses, Internet Protocol (IP) addresses, or Internet Packet Exchange (IPX) addresses.

5. The switch stack of claim 1, further comprising a backplane coupled to the second ports of the stack devices, the backplane having a driver configured to select one of the stack devices as a master, the other stack devices having same real interface address as the driver selected as master.

6. The switch stack of claim 1 wherein each stack device includes a network table to store addresses of stack devices, addresses of interfaces of stack devices, or addresses of nodes in the networks.

7. The switch stack of claim 1 wherein the stack devices asymmetrically routes a packet between the networks, the packet being sent from a node in the one network to a first interface in the first stack device, the first stack device routing the packet to the second stack device, the second stack device sending the packet to the another one of the networks from a second interface in the second stack device.

8. The switch stack of claim 1 wherein the stack devices are configured to transmit a first type of packet only from their first ports and configured to transmit a second type of packet from both their first and second ports.

9. The switch stack of claim 1 wherein the networks comprise virtual local area networks.

10. A method for operating networks, the method comprising:
arranging stack devices in a stack configuration and communicatively coupling the stack devices together at first ports of the stack devices;
connecting the networks to corresponding second ports of the stack devices, the second ports being associated with an interface in respective ones of the stack devices;
assigning a same real address to each interface connected to the same network in the stack devices, each interface to share the same real address with another interface connected to the same network, wherein each stack device concurrently configured to forward a packet received from the same network, the stack device to first receive the packet from the same network to forward the packet; and
routing a packet between first and second networks by sending the packet to an interface of a first stack device associated with the first network, routing the packet to an interface of a second stack device associated with the second network, and forwarding the packet from the interface of the second stack device to the second network.

11. The method of claim 10 wherein arranging the stack devices in the stack configuration comprises:
connecting routing devices in the stack configuration;
connecting non-routing devices in the stack configuration; and
assigning each non-routing device to a corresponding routing device based on addresses of the routing and non-routing devices.

12. The method of claim 10, further comprising asymmetrically routing packets by routing packets from the first network to the second network via the first stack device and routing packets from the second network to the first network via the second stack device.

13. The method of claim 10 wherein assigning the same real address to each interface in the stack devices comprises assigning a same Media Access Control, Internet Protocol address, or Internet Packet Exchange address to each interface.

14. The method of claim 10, further comprising selecting one of the stack devices as master and configuring the other stack devices to have the same real interface addresses as the master.

15. The method of claim 10 wherein connecting the networks to the second ports comprises connecting virtual local area networks to the second ports.

16. The method of claim 10, further comprising refreshing destination addresses in the first stack device if a packet is routed from the first stack device to the second stack device.

17. The method of claim 10, further comprising configuring the stack devices to transmit a first type of packet only from their second ports and configuring the stack devices to transmit a second type of packet from both their first and second ports.

18. The method of claim 10, further comprising storing addresses of nodes of the networks, addresses of the stack devices, or addresses of interfaces of the stack devices.

19. The method of claim 10, wherein the stack devices comprise routing and non-routing devices, the method further comprising:
assigning a non-routing device to a routing device;
forwarding a packet from the non-routing device to only the routing device that is assigned to the non-routing device.

20. The network computer system of claim 19 wherein the plurality of nodes comprises a virtual local area network.

21. The network computer system of claim 19 wherein the real addresses of the first and second interfaces comprise Media Access Control (MAC) addresses, Internet Protocol (IP) addresses, or Internet Packet Exchange (IPX) addresses.

22. The method of claim 10, further comprising:
coupling a new stack device to the stack configuration at a first port of the new stack device; and
connecting the networks to a second port of the new stack device, wherein the second port is associated with interfaces in the new stack device, the interfaces to adopt the same real addresses of corresponding interfaces of the stack devices.

23. A networked computer system, comprising:
a plurality of nodes including a microprocessor in some of the nodes;
a switch stack connected to the plurality of nodes, the switch stack including:
a plurality of stack devices arranged in a stack configuration, each stack device having first ports coupled to the plurality of nodes and second ports coupled to other stack devices in the stack configuration;
a first interface in each stack device associated with one of the first ports and having a same real address as other first interfaces of other stack devices in the stack configuration, the first interface corresponding to a first set of the plurality of nodes coupled to the stack devices, wherein each stack device concurrently configured to forward a packet received from the first set of the plurality of nodes, the stack device to first receive the packet from the first set of the plurality of nodes to forward the packet; and
a second interface in each stack device associated with another one of the first ports and having a same real address as other second interfaces of other stack devices in the stack configuration, the second interface corresponding to a second set of the plurality of nodes coupled to the stack devices, wherein a first stack device routes a packet from the first set of nodes to the second stack device and the second the stack device sends the packet to the second set of nodes; and a network table configured to store addresses of the plurality of nodes, addresses of the stack devices, or addresses of the interfaces of the stack devices.

* * * * *